(12) United States Patent
Kawano et al.

(10) Patent No.: US 10,512,139 B2
(45) Date of Patent: Dec. 17, 2019

(54) LIGHTING CONTROL DEVICE, LIGHTING CONTROL METHOD AND LIGHTING CONTROL PROGRAM

(71) Applicant: Pioneer DJ CORPORATION, Yokohama-shi, Kanagawa (JP)

(72) Inventors: Hirokatsu Kawano, Yokohama (JP); Toshiki Nakai, Yokohama (JP); Junichiro Inoue, Yokohama (JP)

(73) Assignee: PIONEER DJ CORPORATION, Yokohama-Shi (JP)

( * ) Notice: Subject to any disclaimer, the term of this patent is extended or adjusted under 35 U.S.C. 154(b) by 0 days.

(21) Appl. No.: 16/069,761

(22) PCT Filed: Jan. 21, 2016

(86) PCT No.: PCT/JP2016/051721
§ 371 (c)(1),
(2) Date: Jul. 12, 2018

(87) PCT Pub. No.: WO2017/126085
PCT Pub. Date: Jul. 27, 2017

(65) Prior Publication Data
US 2019/0021153 A1  Jan. 17, 2019

(51) Int. Cl.
*H05B 37/02* (2006.01)

(52) U.S. Cl.
CPC ... *H05B 37/0236* (2013.01); *G10H 2210/076* (2013.01)

(58) Field of Classification Search
CPC ............ H05B 37/0236; H05B 37/0245; H05B 37/0254; H05B 37/0281; H05B 37/0272; H05B 37/0227
See application file for complete search history.

(56) References Cited

U.S. PATENT DOCUMENTS

2001/0015123 A1* 8/2001 Nishitani ........... A63B 71/0686
84/615
2002/0038157 A1   3/2002 Dowling et al.
(Continued)

FOREIGN PATENT DOCUMENTS

JP  2000-323282  11/2000
JP     3743079   2/2006
(Continued)

OTHER PUBLICATIONS

International Search Report, dated Apr. 12, 2016 (Apr. 12, 2016), 1 page.
(Continued)

*Primary Examiner* — Douglas W Owens
*Assistant Examiner* — Syed M Kaiser
(74) *Attorney, Agent, or Firm* — Rankin, Hill & Clark LLP

(57) ABSTRACT

A lighting controller is configured to make lighting control data in which lighting control information corresponding to a music piece is recorded and to control a lighting apparatus based on the lighting control data. The lighting controller includes: an information acquisition unit configured to acquire beat position information indicating beat positions of music piece data; a reference position plotting unit configured to plot a plurality of reference positions corresponding one-to-one to the beat positions of the beat position information; a lighting control information setting unit configured to set the lighting control information corresponding to the music piece; and a lighting control information editing unit configured to record the lighting control information with reference to the reference positions.

3 Claims, 5 Drawing Sheets

(56) References Cited

U.S. PATENT DOCUMENTS

Figure 1:
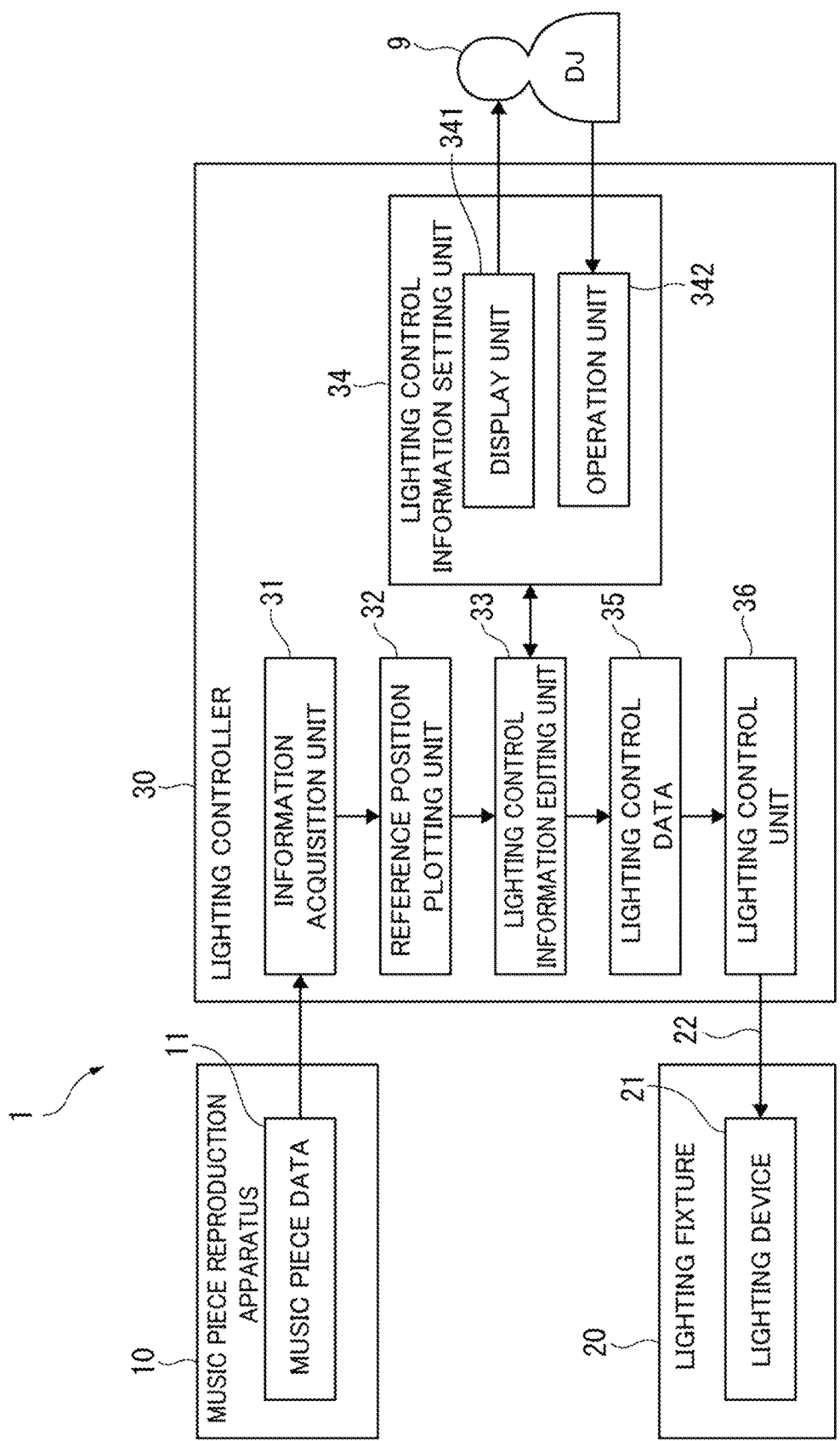

| | | | | |
|---|---|---|---|---|
| 2006/0030907 A1* | 2/2006 | McNew | ............. | A61B 5/02405 |
| | | | | 607/88 |
| 2009/0167192 A1* | 7/2009 | Diederiks | ................ | H04N 9/73 |
| | | | | 315/149 |
| 2010/0211200 A1* | 8/2010 | Kobayashi | ............ | G06T 13/205 |
| | | | | 700/94 |
| 2014/0256511 A1* | 9/2014 | Smith | ...................... | G10H 7/00 |
| | | | | 482/8 |
| 2015/0025664 A1* | 1/2015 | Cory | ......................... | H04S 7/30 |
| | | | | 700/94 |
| 2015/0358707 A1* | 12/2015 | Saijo | ...................... | H04R 1/028 |
| | | | | 381/386 |
| 2015/0359066 A1* | 12/2015 | Loomis | .............. | H05B 37/0245 |
| | | | | 362/123 |
| 2016/0295668 A1* | 10/2016 | Saijo | ......................... | H04R 3/14 |
| 2016/0325187 A1* | 11/2016 | Schwartz | ............... | A63G 21/18 |

FOREIGN PATENT DOCUMENTS

| | | |
|---|---|---|
| JP | 2010-097084 | 4/2010 |
| JP | 2010-192155 | 9/2010 |
| WO | 2014/103118 | 7/2014 |

OTHER PUBLICATIONS

English translation of International Preliminary Report on Patentability dated Jul. 24, 2018 (Jul. 24, 2018), Application No. PCT/JP2016/051721, 6 pages.
European Search Report dated Jul. 16, 2019, 9 pages.

* cited by examiner

LIGHTING CONTROL DEVICE, LIGHTING CONTROL METHOD AND LIGHTING CONTROL PROGRAM

TECHNICAL FIELD

The present invention relates to a lighting controller, a lighting control method, and a lighting control program.

BACKGROUND ART

In a concert and a night club, it is an important stage factor to match lighting with a music piece or change lighting in synchronization with a music piece.

In order to obtain an accurate stage effect by matching lighting with a music piece, a dedicated lighting staff having a good understanding of the music piece desirably manipulates a lighting device. However, it is difficult in terms of costs and the like that the dedicated lighting staff constantly stays in a small-sized concert, night club, event and the like.

In order to overcome this difficulty, it has been attempted to automatically match lighting with a music piece. For instance, according to the technique of Patent Literature 1 or 2, lighting control data relating to lighting contents matched with the music piece is made in advance and is synchronized with the music piece at the time of a performance, whereby the lighting is controlled based on the lighting control data, so that a desired lighting matched with the music piece is realized.

In order to generate the lighting control data, a target music piece data is analyzed in advance and divided into blocks (e.g., a verse, pre-chorus, and chorus), and a lighting pattern suitable to an image of each block is specified to each block.

CITATION LIST

Patent Literature(S)

Patent Literature 1: JP Patent No. 3743079
Patent Literature 2: JP 2010-192155 A

SUMMARY OF THE INVENTION

Problem(s) to be Solved by the Invention

In the above-described lighting control of Patent Literature 1 or 2, it is necessary to generate in advance the lighting control data corresponding to the music piece data. Especially, it is necessary to allocate desired lighting patterns and the like to many blocks of the music piece on a one-to-one basis.

However, if a timing at which the lighting is controlled does not match a corresponding block of the music piece, temporal mismatch is caused between the music piece and the lighting to fail to obtain desired stage effects.

Moreover, for instance, when a disc jockey (DJ) selects music pieces ad lib in a concert and a night club scene, the lighting control data cannot be made in advance. Although it may be possible to urgently generate the lighting control data at a venue in this situation, it is extremely difficult to complete the lighting control data, in which the above-described accurate timings are set, in a short period of time.

An object of the invention is to provide a lighting controller, a lighting control method and a lighting control program, which are capable of easily and suitably setting lighting control data corresponding to a music piece.

Means for Solving the Problem(s)

According to an aspect of the invention, a lighting controller configured to generate lighting control data in which lighting control information corresponding to a music piece is registered and to control a lighting fixture based on the lighting control data includes: an information acquisition unit configured to acquire beat position information indicating beat positions of music piece data; a reference position plotting unit configured to plot a plurality of reference positions corresponding to the beat positions of the beat position information; a lighting control information setting unit configured to set the lighting control information corresponding to the music piece; and a lighting control information editing unit configured to register the lighting control information with reference to the reference positions.

According to another aspect of the invention, a lighting control method of making lighting control data in which lighting control information corresponding to a music piece is registered and controlling a lighting fixture based on the lighting control data includes: acquiring beat position information indicating beat positions of the music piece; plotting a plurality of reference positions corresponding to the beat positions of the beat position information; setting the lighting control information corresponding to the music piece; and registering the lighting control information with reference to the reference positions.

According to still another aspect of the invention, a lighting control program performs the lighting control method according to the above aspect of the invention in a computer system.

BRIEF DESCRIPTION OF DRAWING(S)

FIG. 1 is a block diagram showing a structure of an exemplary embodiment of the invention.

Figure 2:
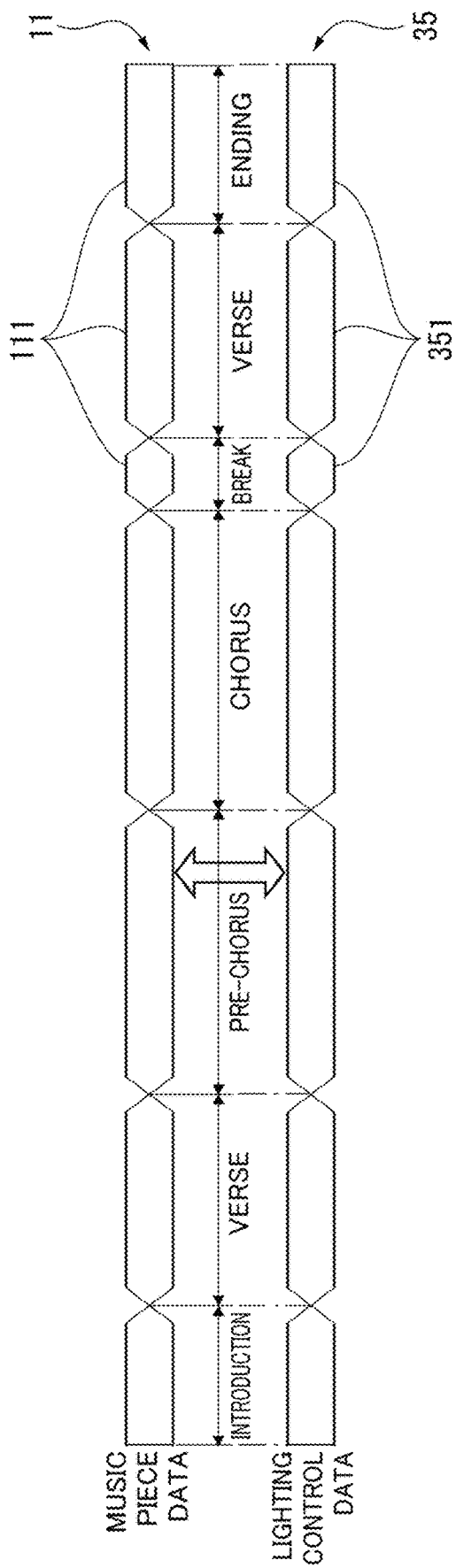

FIG. 2 schematically illustrates lighting control information corresponding to a music piece.

Figure 3:
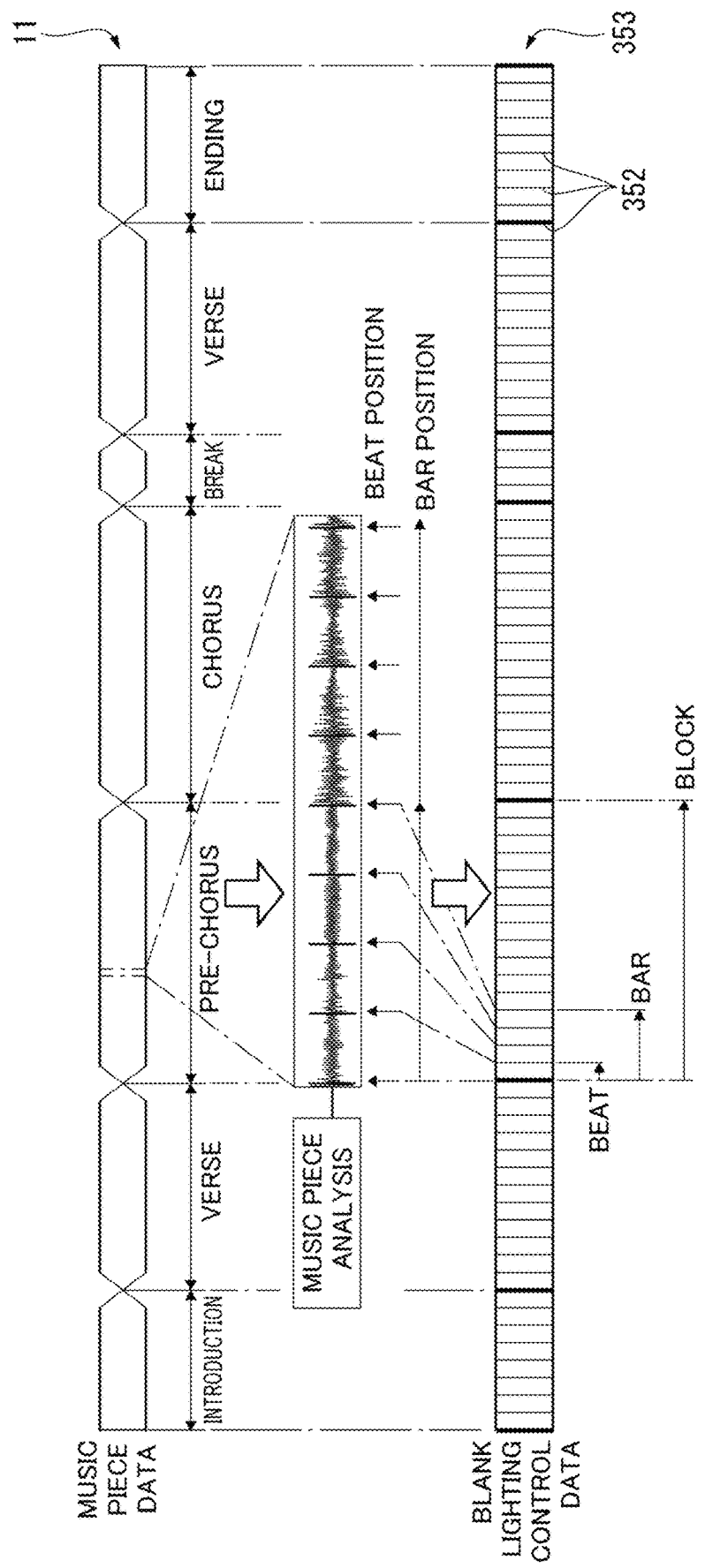

FIG. 3 schematically illustrates analysis of beat positions in a music piece and grids for setting lighting control information for the music piece.

Figure 4:
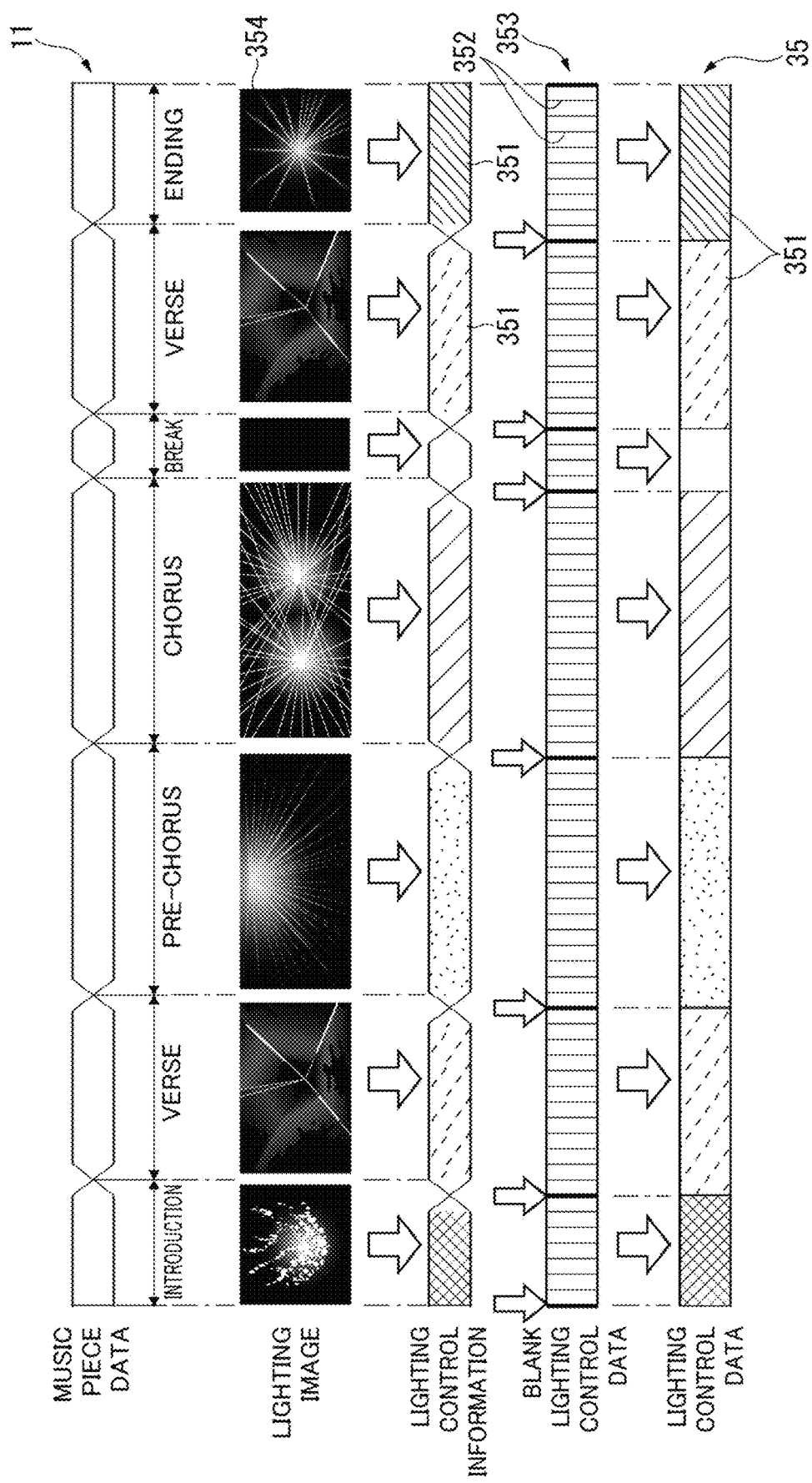

FIG. 4 schematically illustrates a processing of setting the lighting control information in each part of the music piece.

Figure 5:
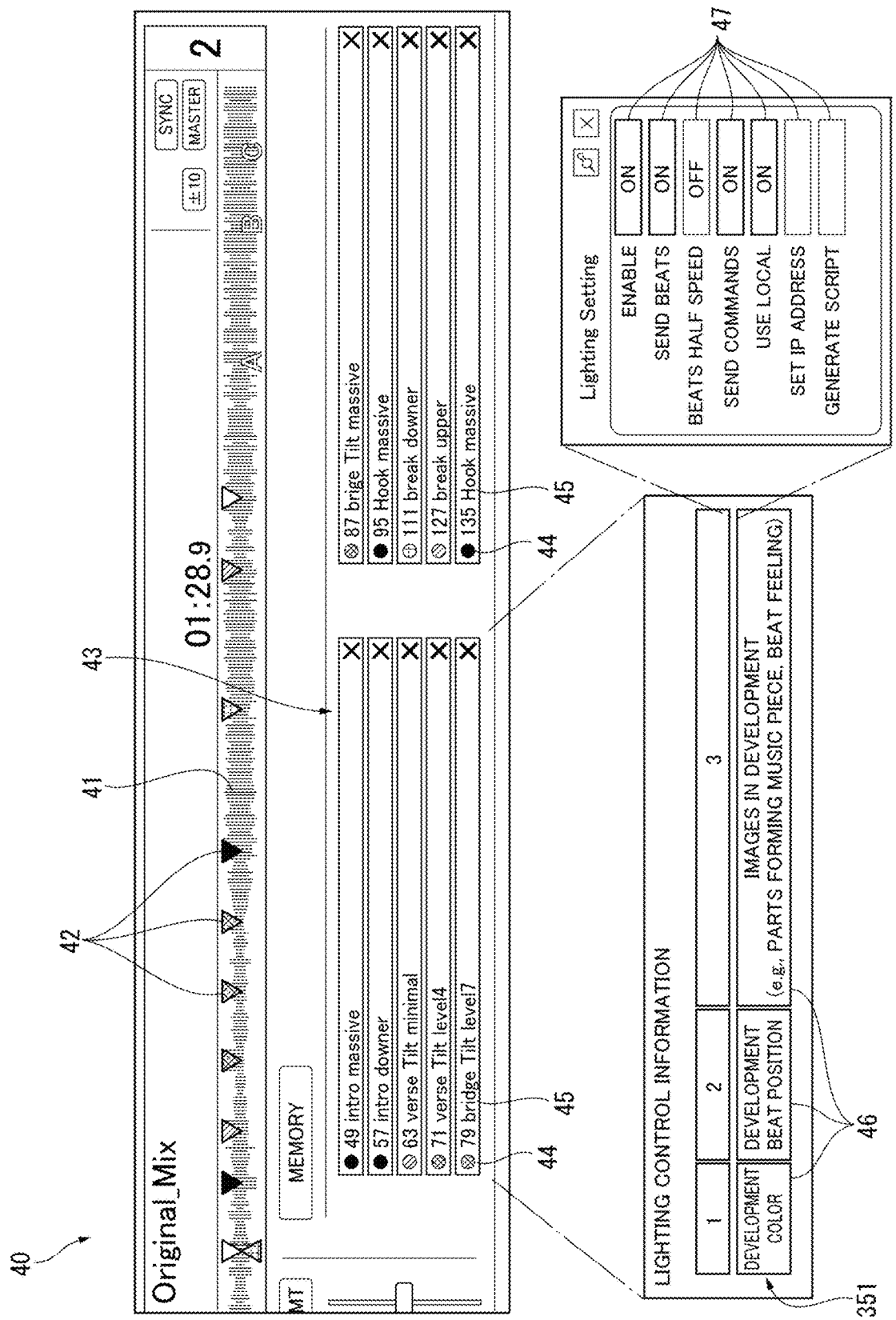

FIG. 5 schematically illustrates a setting screen of the lighting control information displayed on a display unit.

DESCRIPTION OF EMBODIMENT(S)

Exemplary embodiment(s) of the invention will be described below with reference to the attached drawings.

FIG. 1 illustrates a sound responsive lighting system 1 used at a live-performance space in a night club and the like.

The sound responsive lighting system 1 includes: a music piece reproduction apparatus 10 configured to reproduce a music piece; a lighting fixture 20 configured to provide lighting in the live-performance space; and a lighting controller 30 configured to control the lighting fixture 20.

The music piece reproduction apparatus 10 includes: a general-purpose personal computer (PC) installed with a music piece reproduction software; and a sound system connected to the PC. When music piece data 11 stored in the PC is sent as a sound signal to the sound system, the music piece can be reproduced based on the music piece data 11 in the live-performance space.

The music piece data 11 is supplied to the music piece reproduction apparatus 10 via a network communication as well as in a form of a disc.

The music piece reproduction apparatus 10 is not limited to a PC audio system using the above general-purpose PC and may be a dedicated disc reproduction apparatus or music piece data reproduction apparatus. The music piece reproduction apparatus 10 includes a DJ controller used by a user 9 such as a disc jockey (DJ) in order to conduct a special reproduction (e.g., scratching) or an effect operation. Alternatively, the DJ controller may be connected to the music piece reproduction apparatus 10.

The lighting fixture 20, which provides lighting in a live-performance space and an event space, includes various lighting devices 21 mainly used as live-performance equipment.

Examples of the lighting devices 21 mainly used for stage lighting include a bar light, an electronic flash, and a moving head. In each of the lighting devices 21, parameters such as on and off of the lighting, brightness thereof, and, depending on the lighting device, an irradiation direction and a moving speed of the lighting device can be specified.

In order to control the above parameters, the lighting devices 21 of the lighting fixture 20 complying with DMX512 regulations are connected to each other in accordance with the DMX512 regulations and lighting control signals 22 in accordance with the DMX512 regulations are sent to the corresponding lighting devices 21 to allow the lighting devices 21 to provide a desired lighting.

It should be noted that, although the DMX512 regulations are common regulations in a field of the stage lighting, the lighting fixture 20 and a later-described lighting controller 30 may comply with other regulations.

The lighting controller 30 is a general-purpose PC, a built-in device and the like installed with a lighting control software for controlling according to the exemplary embodiment of the invention. The lighting controller 30 may share the above-described PC used for the music piece reproduction apparatus 10.

The lighting controller 30 includes an information acquisition unit 31, a reference position plotting unit 32, a lighting control information editing unit 33, a lighting control information setting unit 34, and a lighting control unit 36 which are configured to function when the above lighting control software runs.

Among the above units, the information acquisition unit 31, the reference position plotting unit 32, the lighting control information editing unit 33, and the lighting control information setting unit 34 are used in order that a user 9 generates the lighting control data 35 according to the exemplary embodiment of the invention.

On the other hand, the lighting control unit 36 is configured to control the lighting fixture 20 based on the prepared lighting control data 35. In the exemplary embodiment, the lighting control unit 36 is configured to function when a DMX control software runs on the PC of the lighting controller 30. The lighting control data 35 is the DMX control program to be processed in the lighting control unit 36.

The lighting control data 35 and the lighting control unit 36 comply with the DMX512 regulations of the lighting fixture 20. When lighting operations are registered in the lighting control data 35 in accordance with the DMX512 regulations, the lighting control unit 36 can control the lighting fixture 20 to perform a desired lighting operation.

It should be noted that the lighting control unit 36 may be not the DMX control software but a hardware DMX controller connected to the PC used as the lighting controller 30. When the lighting fixture 20 complies with regulations other than the DMX regulations, the lighting control unit 36 also complies with the same regulations as those of the lighting fixture 20.

In the exemplary embodiment, pieces of lighting control information are allocated correspondingly one-to-one to parts of the music piece data 11 in the lighting control data 35.

As shown in FIG. 2, the music piece data 11 includes blocks 111 such as an introduction, verse, pre-chorus, chorus, break, verse repetition, and ending.

The pieces of lighting control information 351 one-to-one to the blocks 111 are set in the lighting control data 35. Specifically, the individual piece of the lighting control information 351 is allocated to each of the introduction, the verse, the pre-chorus, the chorus, the break, the verse repetition, and the ending.

In the exemplary embodiment, for such an allocation of the lighting control information 351, the information acquisition unit 31, the reference position plotting unit 32, the lighting control information editing unit 33, and the lighting control information setting unit 34 each perform an individual processing with reference to beat positions.

The information acquisition unit 31 reads in the music piece data 11 from the music piece reproduction apparatus 10, conducts a music piece analysis of the registered sound data to detect the beat positions and tempos of the music piece, and registers the detected beat positions and tempos as beat position information. In the beat position information, the beat positions can be registered as corresponding temporal positions on the music piece data 11.

Further, the information acquisition unit 31 may distinguish a drum sound and a snare sound and, for instance, detect the drum sound at $1^{st}$ and $3^{rd}$ beat positions and the snare sound at $2^{nd}$ and $4^{th}$ beat positions, thereby detecting bar positions. Moreover, the information acquisition unit 31 may analyze keys and chords of the music piece and, for instance, detect a distribution of phrases, thereby detecting a block (e.g., a verse, pre-chorus and chorus) consisting of a plurality of bars.

A technology of conducting such a music piece analysis is exemplified by the technology disclosed in the patent publication JP 2010-97084A.

The reference position plotting unit 32 is configured to plot a plurality of reference positions for allocating the lighting control information based on the beat positions of the beat position information obtained in the information acquisition unit 31.

For instance, blank lighting control data having a length corresponding to a length of the music piece data 11 is initially made. The reference positions are registered at the temporal positions of the blank lighting control data, corresponding to the beat positions of the beat position information. As a result, the blank lighting control data having the length corresponding to the length of the music piece data 11 and being divided into small sections defined by many reference positions can be obtained.

The lighting control information editing unit 33 is configured to generate the lighting control data 35 to be sent to the lighting control unit 36.

For instance, the lighting control information editing unit 33 edits the blank lighting control data to which the reference positions are plotted by the reference position plotting unit 32, and allocates the pieces of lighting control information 351 to the corresponding parts of the blank lighting control data (see FIG. 2).

To-be-allocated lighting control information is set by the lighting control information setting unit 34.

The lighting control information setting unit 34 includes a display unit 341 and an operation unit 342 to be operated by the user 9. The display unit 341 is exemplified by a display screen connected to the PC used as the lighting controller 30. The operation unit 342 is exemplified by a pointing device such as a keyboard and a touchpad connected to the PC.

The display unit 341 is configured to display an image indicating a music piece and reference positions on the image.

The image displayed on the display unit 341 is exemplified by a horizontally-long bar graph indicating the blank lighting control data and grids shown in vertically-long section lines in the bar graph.

The user 9 operates the operation unit 342 to set the pieces of lighting control information 351 suitable to the corresponding parts of the music piece. For instance, when the horizontally-long bar graph indicating a music piece is displayed on the screen of the display unit 341, the user 9 selects any one of the grids of the bar graph and sets a desired lighting control information into the selected grid.

As the desired lighting control information, the above lighting devices 21 in the lighting fixture 20 are specified and the parameters such as On/Off of the lighting, brightness thereof, and, depending on the lighting device, an irradiation direction and a moving speed of the lighting device are specified in each of the lighting devices 21.

The lighting control information may be defined by the user 9 each time when the lighting control information is set. Alternatively, at least a set of highly versatile pieces of lighting control information may be preset in the lighting control information editing unit 33, displayed on the display unit 341, and selected using the operation unit 342.

Still alternatively, the sets of the lighting control information may be combined in advance to generate such a lighting pattern as to evoke a predetermined image (including a simple image such as a dark image, a bright image, a red image and a blue image, and an emotional image such as a lively image, a cheerful image, a lonely image, a sad image, and a frightening image.

The lighting control information set by the lighting control information setting unit 34 is returned to the lighting control information editing unit 33 to be registered at the corresponding part(s) of the blank lighting control data.

For instance, when a lighting control information set A is set at a verse part of a music piece, the lighting control information editing unit 33 embeds a piece of the lighting control information corresponding to the lighting control information set A into a part of the lighting control data corresponding to the verse part.

Here, the lighting control information editing unit 33 registers the lighting control information on the blank lighting control data with reference to the reference positions thereof. In other words, a leading position of the set lighting control information is forced to be positionally adjusted (so-called sucked) to the nearest one of the reference positions.

It should be noted that the leading part of the set lighting control information can be displaced from the nearest one of the reference positions by the operation of the user 9. Specifically, the user 9 only needs to change the temporal positions of the lighting control information in the lighting control data to values showing positions different from the reference positions. Alternatively, the leading position of the set lighting control information may be displaced from the nearest one of the reference positions on the screen of the display unit 341 by operating the operation unit 342.

Next, the operation in the exemplary embodiment will be described.

When the user 9 specifies the music piece data 11 in the music piece reproduction apparatus 10, the information acquisition unit 31 of the lighting controller 30 performs a music piece analysis to the music piece data 11. Subsequently, the reference position plotting unit 32 generates blank lighting control data that is divided at the reference positions into sections.

As shown in FIG. 3, the beat positions are detected from beats appearing in an audio signal level in each part of the music piece data 11. The reference positions 352 are allocated on the blank lighting control data 353 based on the beat positions.

The blank lighting control data 353 is displayed on the display unit 341 in a form of a bar graph divided into grids for setting the lighting control information.

The user 9 operates the operation unit 342 of the lighting control information setting unit 34 to set the lighting control information for each block. The set lighting control information is allocated into the blank lighting control data by the lighting control information editing unit 33 to generate the lighting control data 35.

As shown in FIG. 4, the user 9 determines a lighting image 354 based on an image of each block of the music piece data 11. The lighting control information 351 specifically expressing the lighting image 354 is allocated to the blank lighting control data 353.

The blank lighting control data 353 is displayed in the form of the bar graph on the display unit 341. The grids showing the reference positions 352 are displayed in the bar graph.

The user 9 specifies the lighting control information 351 to a rough position of the corresponding one of the grids. Although this positioning is rough, the lighting control information editing unit 33 accurately positions the lighting control information 351 to the closest one of the reference positions 352.

With this operation, the lighting control data 35 in which the lighting control information 351 is accurately allocated in the reference positions 352 is made.

FIG. 5 shows an operation screen that the user 9 uses for determining the lighting control information 351 based on an image of each block of the music piece data 11.

On a screen 40, a level graph 41 of the music piece data 11 is displayed along an upper side of the screen 40, and a lot of lighting control information icons 42 are disposed along the time axis.

A lighting control information list 43 is displayed on a lower side of the screen 40. A marker 45 in a color indicating a correspondence relationship with each of the above lighting control information icons 42 is displayed in a lighting control information title 44 of the list.

When the lighting control information title 44 on the display is clicked and the like, contents 46 of the lighting control information 351 corresponding to the lighting control information title 44 are displayed. When each of the contents 46 on the display is further clicked and the like, a setting screen for further detailed lighting control contents 47 is displayed.

According to the above-described exemplary embodiment, even if the user 9 roughly positions the lighting control information 351 in the blank lighting control data 353 corresponding to the music piece data 11, the lighting control information 351 is registered with reference to the reference positions 352 in conformity with the beat positions. In other words, in the obtained lighting control data 35, the pieces of lighting control information 351 corresponding one-to-one to the parts of the music piece data 11 are registered with reference to the beat positions, so that a temporal mismatch between the music piece and the lighting can be avoided.

Moreover, since the pieces of lighting control information 351 are automatically adjusted to positions matched with the beat positions, even if the lighting control data 35 is made in a short time, a delicate operation is reducible and an easy and appropriate operation is obtainable.

Moreover, in the exemplary embodiment, the lighting control information 351 can be set using the operation unit 342 into the image (the blank lighting control data 353) of the music piece displayed on the display unit 341. Specifically, the lighting control information 351 is registered with reference to the reference positions 352 shown in the grids in the blank lighting control data 353 displayed in a bar graph. In other words, even if the lighting control information 351 set using the operation unit 342 does not positionally conform with the grids, the lighting control information 351 is automatically positionally sucked into the grids. Accordingly, even in a hasty operation by the operation unit 342, the lighting control information 351 can be reliably set at suitable positions with reference to the beat positions.

It should be understood that the scope of the invention is not limited to the above-described exemplary embodiment but includes modifications and the like as long as the modifications and the like are compatible with the invention.

For instance, the music piece reproduction apparatus 10 is not limited to a PC audio system but may be a dedicated disc reproduction apparatus or music piece data reproduction apparatus. Moreover, the music piece reproduction apparatus 10 may include a DJ controller to be operable by a DJ or may be connected with the DJ controller.

The lighting fixture 20 and the lighting controller 30 are not limited to those complying with the DMX512 regulations, but may comply with other regulations.

Further, although the beat positions are detected as the reference positions to be defined as the reference for positioning the lighting control information in the above exemplary embodiment, the unit for specifying the lighting control information is not limited to a length with reference to the beat position, but may be a bar unit or a block unit (e.g., verse, pre-chorus and chorus) consisting of a plurality of bars, in which the lighting control information may be set at each unit.

It should be noted that, even when the bar unit or the block unit is defined as the unit for specifying the lighting control information, the reference positions may be defined with reference to the beat positions.

The invention claimed is:

1. A lighting controller configured to generate lighting control data in which lighting control information corresponding to a music piece is registered and to control a lighting fixture based on the lighting control data, the lighting controller comprising:
   an information acquisition unit configured to acquire beat position information indicating beat positions of the music piece;
   a reference position plotting unit configured to plot a plurality of reference positions corresponding to the beat positions of the beat position information;
   a lighting control information setting unit configured to set the lighting control information corresponding to the music piece, in response to an operation of a user; and
   a lighting control information editing unit configured to register the lighting control information with reference to the reference positions; wherein
   the lighting control information setting unit comprises a display unit and an operation unit, wherein
   the display unit displays an image indicating the music piece and a grid indicating each of the reference positions over the image, and
   the lighting control information is allowed to be set in the grid using the operation unit.

2. A lighting control method of making lighting control data in which lighting control information corresponding to a music piece is registered and controlling a lighting fixture based on the lighting control data, the lighting control method comprising:
   acquiring beat position information indicating beat positions of the music piece;
   plotting a plurality of reference positions corresponding to the beat positions of the beat position information;
   setting the lighting control information corresponding to the music piece, by an operation of a user;
   registering the lighting control information with reference to the reference positions;
   providing a lighting control information setting unit having a display unit and an operation unit;
   displaying on the display unit an image indicating the music piece and a grid indicating each of the reference positions over the image; and,
   setting the lighting control information in the grid via the operation unit.

3. A non-transitory medium containing a lighting control program for performing the lighting control method according to claim 2 in a computer system.

* * * * *